United States Patent [19]
Ouchi et al.

[11] 3,963,631

[45] *June 15, 1976

[54] METHOD OF PREPARING FERROELECTRIC CERAMICS

[75] Inventors: Hiromu Ouchi, Toyonaka; Masamitsu Nishida, Osaka; Kazunori Numata, Moriguchi, all of Japan

[73] Assignee: Matsushita Electric Industrial Co., Ltd., Japan

[ * ] Notice: The portion of the term of this patent subsequent to May 11, 1993, has been disclaimed.

[22] Filed: Feb. 3, 1975

[21] Appl. No.: 546,780

[30] Foreign Application Priority Data

Feb. 20, 1974 Japan................................ 49-20823

[52] U.S. Cl. ............................................. 252/62.9
[51] Int. Cl.² .................. C04B 35/46; C04B 35/48
[58] Field of Search .................................. 252/62.9

[56] References Cited
UNITED STATES PATENTS

| | | | |
|---|---|---|---|
| 3,518,199 | 6/1970 | Tsbouchi et al. | 252/62.9 |
| 3,528,918 | 9/1970 | Nishida et al. | 252/62.9 |
| 3,595,795 | 7/1971 | Tsubouchi et al. | 252/62.9 |
| 3,669,887 | 6/1972 | Nishida et al. | 252/62.9 |
| 3,699,045 | 10/1972 | Tsubouchi et al. | 252/62.9 |

*Primary Examiner*—Jack Cooper
*Attorney, Agent, or Firm*—Wenderoth, Lind & Ponack

[57] ABSTRACT

A process for preparing strengthened ferroelectric ceramics, which comprises sintering ceramic materials and then heat treating the sintered ceramics at a temperature from about 100° to about 400°C lower than the final sintering temperature of ceramics, for about 1 to about 60 hrs., and then cooling at a rate from about 300° to about 10°C per hour. Strengthened ferroelectric ceramics are obtained among the following ferroelectric ceramic compositions:

I. $Pb([B_1]_A Ta_{1-A})O_3$—$PbTiO_3$—$PbZrO_3$, where $[B_1]$ is Mg, Zn, Cd, Sn, Mn, Fe, Co, and Ni when $A=\frac{1}{3}$ and $[B_1]$ is Li and Cu when $A=\frac{1}{4}$, II. $Pb([B_2]_B Ta_{1-B})O_3$—$Pb([B_3]_C Ta_{1-C})O_3$—$PbTiO_3$—$PbZrO_3$, where $[B_2]$ and $[B_3]$, $[B_2] \neq [B_3]$, are Mg, Zn, Cd, Sn, Mn, Fe, Co and Ni when B and $C=\frac{1}{3}$, and $[B_2]$ and $[B_3]$, $[B_2] \neq [B_3]$, are Li and Cu when B and $C=\frac{1}{4}$, III. $Pb([B_1]_A Ta_{1-A})O_3 PbTiO_3$—$PbZrO_3$ with $MnO_2$, where $[B_1]$ is Mg, Zn, Cd, Sn, Fe, Co and Ni when $A=\frac{1}{3}$, and $[B_1]$ is Li and Cu when $A=\frac{1}{4}$, and IV. $Pb([B_2]_B Ta_{1-B})O_3$—$Pb([B_3]_C Ta_{1-C})O_3$—$PbTiO_3$—$PbZrO_3$ with $MnO_2$, where $[B_2]$ and $[B_3]$, $[B_2] \neq [B_3]$, are Mg, Zn, Cd, Sn, Fe, Co and Ni when B and $C=\frac{1}{3}$, and $[B_2]$ and $[B_3]$, $[B_2] \neq [B_3]$, are Li and Cu when B and $C=\frac{1}{4}$.

6 Claims, No Drawings

METHOD OF PREPARING FERROELECTRIC CERAMICS

This invention relates to a method of preparing ferroelectric ceramics, especially strengthened ferroelectric ceramic bodies, and more particularly relates to a method of mechanically strengthening ferroelectric ceramics by heat treatment after the final sintering of the ceramics.

Ferroelectric ceramics of barium titanate and lead titanate zirconate are commonly used in a wide range of applications. The use of piezoelectric materials in various transducer applications in the production, measurement and sensing of sound, shock, vibration, pressure, etc., have increased greatly in recent years. Both crystal and ceramic types of transducers have been widely used. But because of their potentially lower cost and facility in the fabrication of ceramics with various shapes and sizes and their greater durability for high temperature and/or humidity than that of crystalline substances, piezoelectric ceramic materials have recently become important in various transducer applications.

These ferroelectric ceramics are commonly made from the sintering of ferroelectric ceramic compositions. Thereafter sintered ceramics are polarized by applying a D.C. voltage between the electrodes in order to impart thereto electromechanical transducing properties similar to the well known piezoelectric effect.

The characteristics required for piezoelectric ceramics vary with species of application. For example, piezoelectric ceramics for electric wave filter application at relatively low power level require a specified value of coupling coefficient, a high mechanical quality factor and a high stability with respect to aging and temperature. On the other hand, piezoelectric ceramics for electromechanical transducer applications which need high power operation (i.e. capable of withstanding high mechanical pressures or electrical driving fields) such as piezoelectric ceramic transformers for high voltage generation and ultrasonic cleaner transducers, should have a substantially high electromechanical coupling coefficient, a high mechanical quality factor and a high mechanical tensile strength. As is well understood by those skilled in the electromechanical transducer art, one of the prime requisites of a material employed in the fabrication of transducer elements for high powder operation is an improvement in the mechanical tensile strength. The improvement of mechanical strength has been developed to a considerable extent in lead zirconate titanate ceramic material by the addition of small quantities of oxide. However, it is difficult for lead zirconate titanate ceramic materials to become mechanically strengthened and yet have active electromechanical transducing properties. The lead zirconate titantate ceramics are liable to be broken down even when the ceramic element is employed under high power operation within the region of linear piezoelectric properties.

Therefore, it is important to increase the mechanical tensile strength of the ceramic material to obtain a stable high power operation in electromechanical transducer application.

This invention contemplates a method of preparing mechanically strengthened ferroelectric ceramics which are particularly suited and adapted for use in piezoelectric ceramic transformers, ultrasonic cleaners or other applications requiring the same combination of properties.

It is the fundamental object of this invention to provide a method of preparing mechanically strengthened ferroelectric ceramics which overcome the problems of the prior art as outlined above.

Another object of this invention is to provide ferroelectric ceramics particularly adapted for use in piezoelectric ceramic transformers or other applications requiring high mechanical tensile strength and high power operation.

These objects of this invention and the manners of their attainment will be readily apparent to those conversant with the art from reading of the following description and claims.

The present invention provides a method of preparing mechanically strengthened ferroelectric ceramics which essentially comprise a complex compound, lead titanate and lead zirconate as principal constituents and without and with manganese dioxide as an additive.

Ferroelectric ceramics prepared by heat treatment according to this invention have excellent properties in which mechanical tensile strength is increased by 77 to 7% and resonant impedance is decreased by 25 to 12% compared to ceramics without heat treatment.

This invention is based on the discovery that within particular condition of heat treatment of the sintered ceramic materials as hereinafter described with particularity, the complex compound combined with lead titanate and lead zirconate ceramic materials, exhibits a unique combination of properties, particularly improved mechanical tensile strength, making them suitable for use as electro-mechanical transducers for high power operation such as piczoelectric ceramic transformers and so on. The strengthened ferroelectric ceramics prepared by heat treatment according to this invention include the following materials:

I. $Pb([B_1]_A Ta_{1-A})O_3$—$PbTiO_3$—$PbZrO_3$, where $[B_1]$ is Mg, Zn, Cd, Sn, Mn, Fe, Co and Ni when $A=\frac{1}{3}$ and $[B_1]$ is Li and Cu when $A=\frac{1}{4}$, II. $Pb([B_2]_B Ta_{1-B})O_3$—$Pb(B_3]_C Ta_{1-C})O_3$—$PbTiO_3$—$PbZrO_3$, where $[B_2]$ and $[B_3]$, $[B_2]\neq[B_3]$, are Mg, Zn, Cd, Sn, Mn, Fe, Co and Ni when B and $C=\frac{1}{3}$, and $[B_2]$ and $[B_3]$, $[B_2]\neq[B_3]$, are Li and Cu when B and $C=\frac{1}{4}$ III. $Pb([B_1]_A Ta_{1-A})O_3$—$PbTiO_3$—$PbZrO_3$ with $MnO_2$, where $[B_1]$ is Mg, Zn, Cd, Sn, Fe, Co and Ni when $A=\frac{1}{3}$, and $[B_1]$ is Li and Cu when $A=\frac{1}{4}$, and IV. $Pb([B_2]_B Ta_{1-B})O_3$—$Pb([B_3]_C Ta_{1-C})O_3$—$PbTiO_3$—$PbZrO_3$ with $MnO_2$, where $[B_2]$ and $[B_3]$, $[B_2]\neq[B_3]$, are Mg, Zn, Cd, Sn, Fe, Co and Ni when B and $C=\frac{1}{3}$, and $[B_2]$ and $[B_3]$, $[B_2]\neq[B_3]$, are Li and Cu when B and $C=\frac{1}{4}$.

In ordinary prior techniques, these ferroelectric ceramics are made from the following typical process comprising (1) intimately wet-mixing the constituent powder raw materials after the desired constituent powders are weighed. These materials are often in the form of oxides, hydroxides, or carbonates, and the proper amounts of all constituents are computed from their atom formulae preferably using reagent grade, or better, material; (2) drying said mixture; (3) calcining said mixture at temperature from 700° to 900°C for from 0.5 to 3 hours (generally 2 hours for crucible calcined materials) to produce a solid solution; (4) wet-grinding said calcined material and drying it to prepare a homogeneous fine particulate material; (5) mixing it with binder solution such as polyvinyl alcohol solution and granulating; (6) forming said mixtures into a predetermined shape by pressing at a pressure of 700 kg/cm$^2$; (7) loading it into an alumina sagger; and (8) firing said shaped mixture at temperature from about 1200° to about 1300°C for about 1 hour to obtain the sintered ferroelectric ceramics. One of the features of the method of this invention is in that the thus obtained sintered ceramics are re-heated for 1 to 60 hours at a temperature lower by 100° to 400°C than the firing (sintering) temperature, and are then cooled at a cooling rate of 300° to 10°C per hour. Thereby, ferroelectric ceramics having a mechanically high tensile strength and a low impedance in the resonance state thereof are produced.

This invention will be understood more readily with reference to the following Examples I to IV, but these Examples are intended to illustrate the invention only and not to be construed to limit the scope of the invention.

EXAMPLE I

In this Example, ceramics expressible by $xPb(Ni_{1/3}Ta_{2/3})O_3 - yPbTiO_3 - zPbZrO_3$ ($x > 0$, $y > 0$, $z > 0$, $x+y+z=1$) were selected to be subjected to the novel method. By weighing commercially available PbO, NiO, Ta$_2$O$_5$, TiO$_2$, and ZrO$_2$ of high purity grade, a mixture thereof in which $x = 0.37$, $y = 0.36$ according to the above expression was prepared. The mixture was wet-milled in a ball mill for 17 hours, and was then dried. It was then compressed into a compressed body and calcined at 850°C for 2 hours. The thus calcined material was ground and mixed with polyvinyl alcohol as a binder solution. This mixture was granulated, and then compressed to the form of an I-shaped plate at a pressure of 700 kg/cm$^2$. This I-shaped plate was fired at 1280°C for 45 minutes. The thus fired plate (ceramic) had a tensile strength of 152 kg/cm$^2$ (cross-section of specimen: about 7×3 mm). The thus obtained ceramic plate was heated for 1 to 60 yours at a temperature lower by 100° to 400°C than the firing temperature, and was then cooled at a cooling rate of 50°C per hour. The ceramics obtained in this manner had tensile strengths as shown in Table 1. Each value of Table 1 is an average value obtained by averaging the tensile strengths of five specimens made in the same manner.

Table 1

| Heating Condition and Tensile Strength (kg/cm$^2$) | | | | |
|---|---|---|---|---|
| | | Heating time (hour) | | |
| | | 1 | 20 | 60 | 80 |
| Heating Temp. (°C) | 800 | — | 149 | 144 | — |
| | 880 | 168 | 195 | 186 | 150 |
| | 1000 | 210 | 235 | 229 | — |
| | 1100 | 227 | 267 | 235 | — |
| | 1180 | 166 | 178 | 169 | 143 |
| | 1230 | 146 | — | 142 | — |

To examine the influence of the cooling rate, specimens were made in a manner the same as that described above, except that the cooling rate was changed. Table 2 shows the result thereof, in which each value therein is an average value obtained by averaging the tensile strengths of five specimens made in the same manner.

Table 2

| Heating Condition, Cooling Rate and Tensile Strength (kg/cm$^2$) | | | |
|---|---|---|---|
| | Heating Condition | | |
| | 800°C 60 hours | 1000°C 20 hours | 1180°C 1 hour |
| Cooling Rate (°C/hr) | 300 | 170 | 197 | 163 |
| | 50 | 186 | 235 | 166 |
| | 10 | 180 | 228 | 171 |

EXAMPLE II

In this Example, ceramics expressible by $wPb(Mg_{1/3}Ta_{2/3})O_3 - xPb(Mn_{1/3}Ta_{2/3})O_3 - yPbTiO_3 - zPbZrO_3$ ($w > 0$, $x > 0$, $y > 0$, $z > 0$, $w+x+y+z=1$) were selected to be subjected to the novel method. By weighing commercially available PbO, MgO, Ta$_2$O$_5$, MnO$_2$, TiO$_2$ and ZrO$_2$ of high purity grade, a mixture thereof in which $w = x = 0.06$ and $y = 0.44$ according to the above expression was prepared. The mixture was wet-milled in a ball mill for 17 hours, and was then dried. It was then compressed into a compressed body and calcined at 850°C for 2 hours. The thus calcined material was ground and mixed with polyvinyl alcohol as a binder solution. This mixture was granulated, and then compressed to the form of an I-shaped plate at a pressure of 700 kg/cm$^2$. This I-shaped plate was fired at 1280°C for 45 minutes. The thus fired plate (ceramic) had a tensile strength of 280 kg/cm$^2$. The thus obtained ceramic plate was heated for 1 to 60 hours at a temperature lower than 100° to 400°C than the firing temperature, and was then cooled at a cooling rate of 50°C per hour. The ceramics obtained in this manner had tensile strengths as shown in Table 3. Each value of Table 3 is an average value obtained by averaging the tensile strengths of five specimens made in the same manner.

Table 3

| Heating Condition and Tensile Strength (kg/cm$^2$) | | | | |
|---|---|---|---|---|
| | | Heating Time (hour) | | |
| | | 1 | 20 | 60 | 80 |
| Heating Temp. (°C) | 800 | — | 276 | 270 | — |
| | 880 | 320 | 330 | 315 | 272 |
| | 1000 | 335 | 384 | 346 | — |
| | 1100 | 372 | 435 | 360 | — |
| | 1180 | 327 | 336 | 310 | 265 |
| | 1230 | 275 | — | 262 | — |

To examine the influence of the cooling rate, specimens were made in a manner the same as that described above, except that the cooling rate was changed. Table 4 shows the results thereof, in which each value therein is an average value obtained by averaging the tensile strengths of five specimens made in the same manner.

Table 4

| Heating Condition, Cooling Rate and Tensile Strength (kg/cm$^2$) | | | |
|---|---|---|---|
| | Heating Condition | | |
| | 880°C 60 hours | 1000°C 20 hours | 1180°C 1 hour |
| Cooling Rate | 300 | 310 | 346 | 315 |
| | 50 | 315 | 384 | 327 |

Table 4-continued

| | Heating Condition, Cooling Rate and Tensile Strength (kg/cm²) | | | |
|---|---|---|---|---|
| | | Heating Condition | | |
| | | 880°C 60 hours | 1000°C 20 hours | 1180°C 1 hour |
| (°C/hr) | 10 | 312 | 370 | 320 |

EXAMPLE III

In this Example, ceramics expressible by $xPb(Li_{1/4}Ta_{3/4})O_3 - yPbTiO_3 - zPbZrO_3 + m$ wt.% $MnO_2$ ($x>0$, $y>0$, $z>0$ $m>0$, $x+y+z=1$) were selected to be subjected to the novel method. By weighing commercially available PbO, $Li_2CO_3$, $Ta_2O_5$, $TiO_2$, $ZrO_2$ and $MnO_2$ of high purity grade, a mixture thereof in which $x=0.1$, $y=0.43$ and $m=0.8$ according to the above expression was prepared. The mixture was wet-milled in a ball mill for 17 hours, and was then dried. It was then compressed into a compressed body and calcined at 850°C for 2 hours. The thus calcined material was ground and mixed with polyvinyl alcohol as a binder solution. This mixture was granulated, and then compressed to the form of an I-shaped plate at a temperature of 700 kg/cm². This I-shaped plate was fired at 1250°C for 45 minutes. The thus fired plate (ceramic) had a tensile strength of 275 kg/cm². The thus obtained ceramic plate was heated for 1 to 60 hours at a temperature lower by 100° to 400°C than the firing temperature, and was then cooled at a cooling rate of 50°C per hour. The ceramics obtained in this manner had tensile strengths as shown in Table 5. Each value of Table 5 is an average value obtained by averaging the tensile strengths of five specimens made in the same manner. In the method of this invention, the heat treatment can exhibit its advantage even if it is carried out without a time break after the firing (sintering) step. The * marks in Table 5 represent that the heat treatment was carried out without a time break after the firing step.

Table 5

| | Heating Condition and Tensile Strength (kg/cm²) | | | |
|---|---|---|---|---|
| | | Heating time (hour) | | |
| | 1 | 20 | 60 | 80 |
| Heating Temp. (°C) | | | | |
| 750 | — | 270 | 266 | — |
| 850 | 317 | 330 | 325 | 271 |
| 1000 | 340* | 382* | 348* | — |
| 1150 | 320 | 336 | 310 | 260 |
| 1200 | 268 | — | 256 | — |

To examine the influence of the cooling rate, specimens were made in a manner the same as that described above, except that the cooling rate was changed. Table 6 shows the result thereof, in which each value therein is an average value obtained by averaging the tensile strengths of five specimens made in the same manner. Further, the methods represented by the value with * marks in Table 6 correspond to the methods represented by the values with * marks in table 5, respectively.

Table 6

| | Heating Condition, Cooling Rate and Tensile Strength (kg/cm²) | | |
|---|---|---|---|
| | Heating Condition | | |
| | 850°C 60 hours | 1000°C 20 hours | 1150°C 1 hours |
| Cooling Rate (°C/hr) | | | |
| 300 | 309 | 343 | 305 |
| 50 | 325 | 382* | 320 |
| 10 | 318 | 362* | 310 |

EXAMPLE IV

In this Example, ceramics expressible by $wPb(Zn_{1/3}Ta_{2/3})O_3 - xPb(Sn_{1/3}Ta_{2/3})O_3 - yPbTiO_3 - zPbZrO_3 + m$ wt% $MnO_2$ ($w>0$, $x>0$, $y>0$, $z>0$, $m>0$, $w+x+y+z=1$) were selected to be subjected to the novel method. By weighing commercially available PbO, ZnO, $Ta_2O_5$, $SnO_2$, $TiO_2$, $ZrO_2$ and $MnO_2$ of high purity grade, a mixture thereof in which $w=x=0.05$, $y=0.44$ and $m=1.0$ according to the above expression was prepared. The mixture was wet-milled in a ball mill for 17 hours, and was then dried. It was then compressed into a compressed body and calcined at 850°C for 2 hours. The thus calcined material was ground and mixed with polyvinyl alcohol as a binder solution. This mixture was granulated, and then compressed to the form of an I-shaped plate at a pressure of 700 kg/cm². This I-shaped plate was fired at 1280°C for 45 minutes. The thus fired plate (ceramic) had a tensile strength of 248 kg/cm². The thus obtained ceramic plate was heated for 1 to 60 hours at a temperature lower by 100° to 400°C than the firing temperature, and was then cooled at a cooling rate of 50°C per hour. The ceramics obtained in this manner had tensile strengths as shown in Table 7. Each value of Table 7 is an average strength of five specimens made in the same manner.

Table 7

| | Heating Condition and Tensile Strength (kg/cm²) | | | |
|---|---|---|---|---|
| | | Heating Time (hour) | | |
| | 1 | 20 | 60 | 80 |
| Heating Temp. (°C) | | | | |
| 800 | — | 249 | 240 | — |
| 880 | 325 | 338 | 322 | 246 |
| 1000 | 340 | 382 | 341 | — |
| 1100 | 379 | 440 | 373 | — |
| 1180 | 335 | 344 | 316 | 243 |
| 1230 | 245 | — | 240 | — |

To examine the influence of the cooling rate, specimens were made in a manner the same as that described above, except that the cooling rate was changed. Table 8 shows the result thereof, in which each value therein is an average value obtained by averaging the tensile strengths of five specimens made in the same manner.

Table 8

| | Heating Condition, Cooling Rate and Tensile Strength (kg/cm²) | | |
|---|---|---|---|
| | Heating Condition | | |
| | 880°C 60 hours | 1000°C 20 hours | 1180°C 1 hour |
| Cooling Rate (°C/hr) | | | |
| 300 | 314 | 348 | 310 |
| 50 | 322 | 382 | 335 |
| 10 | 320 | 374 | 318 |

As apparent from these Examples I to IV, the mechanical tensile strength of ferroelectric ceramics which have been subjected to sintering (firing) step can be remarkably increased (by 77 to 7% in comparison with those not subjected to the heat and cooling treatment in the method of this invention) by heating the ceramics for about 1 to about 60 hours at a temperature lower by about 100° to 400°C than the optimum sintering temperature, and cooling the thus heated ceramics at a cooling rate of about 300° to about 10°C per hour. The tensile strengths of the ferroelectric ceramics falling within this invention but falling outside the range of Examples I to IV also showed improvements comparable to the values shown in the Tables therein, when they were subjected to the heating and cooling treatment of this invention. Further, the ferroelectric ceramics, when subjected to the heating and cooling treatment in this invention, showed a decrease in their impedance by about 25 to 12% under a resonance state, in comparison with those not subjected to the heating and cooling treatment of this invention. Besides, it should be noted, as apparent e.g. from Example III, that the heating and cooling treatment of this invention can also exhibit advantage when it is carried out without a time break after the sintering step (for making the primary ceramics) which is a final step of the conventional method, not only when it is carried out for the ceramics having been sintered and then cooled to room temperature.

What is claimed is:

1. A method of preparing a ferroelectric ceramic selected from the group consisting of:

I. $Pb([B_1]_A Ta_{1-A})O_3$—$PbTiO_3$—$PbZrO_3$, where $[B_1]$ is one member selected from the group consisting of Mg, Zn, Cd, Sn, Mn, Fe, Co and Ni when $A=\frac{1}{3}$, and $[B_1]$ is one member selected from the group consisting of Li and Cu when $A=\frac{1}{4}$, II. $Pb([B_2]_B Ta_{1-B})O_3$—$Pb[B_3]_C Ta_{1-C})O_3$—$PbTiO_3$—$PbZrO_3$, where each of $[B_2]$ and $[B_3]$, $[B_2] \neq [B_3]$, is one member selected from the group consisting of Mg, Zn, Cd, Sn, Mn, Fe, Co and Ni for when B and $C=\frac{1}{3}$, and each of $[B_2]$ and $[B_3]$, $[B_2] \neq [B_3]$, is one member selected from the group consisting of Li and Cu when B and $C=\frac{1}{4}$, III. $Pb([B_1]_A Ta_{1-A})O_3$—$PbTiO_3$—$PbZrO_3$ with $MnO_2$, where $[B_1]$ is one member selected from the group consisting of Mg, Zn, Cd, Sn, Fe, Co and Ni when $A=\frac{1}{3}$, and $[B_1]$ is Li and Cu when $A=\frac{1}{4}$, and IV. $Pb([B_2]_B Ta_{1-B})O_3$—$Pb([B_3]_C Ta_{1-C})O_3$—$PbTiO_3$—$PbZrO_3$ with $MnO_2$, where each of $[B_2]$ and $[B_3]$, $[B_2] \neq [B_3]$, is one member selected from the group consisting of Mg, Zn, Cd, Sn, Fe, Co and Ni when B and $C=\frac{1}{3}$, and each of $[B_2]$ and $[B_3]$, $[B_2] \neq [B_3]$, is one member selected from the group consisting of Li and Cu when B and $C=\frac{1}{4}$, said method comprising: calcining at 700° to 900°C a powdered mixture of the oxides, hydroxides, or carbonates of the metals to be contained in the ceramics to form a solid solution and then sintering at 1200° to 1300°C, then heat treating at a temperature lower by about 100° to 400°C than the sintering temperature, maintaining said heat treating for about 1 to 60 hours, and then cooling the material subjected to said heat treatment at a cooling rate of from about 300°C per hour to about 10°C per hour, so as to increase the tensile strength and decrease the resonant impedance of said ceramics.

2. A method of preparing a ferroelectric ceramic of the formula $Pb(Ni_{1/3}Ta_{2/3})O_3$—$PbTiO_3$—$PbZrO_3$ in solid solution, said method comprising: calcining at 700° to 900°C a powdered mixture of the oxides, hydroxides, or carbonates of the metals to be contained in the ceramics to form a solid solution and then sintering at 1200° to 1300°C, then heat treating at a temperature lower by about 100° to 400°C than the sintering temperature, maintaining said heat treating for about 1 to 60 hours, and then cooling the material subjected to said heat treatment at a cooling rate of from about 300°C per hour to about 10°C per hour, so as to increase the tensile strength and decrease the resonant impedance of said ceramics.

3. A method of preparing a ferroelectric ceramic of the formula $Pb(Mg_{1/3}Ta_{2/3})O_3$—$Pb(Mn_{1/3}Ta_{2/3})O_3$—$PbTiO_3$—$PbZrO_3$ in solid solution, said method comprising: calcining at 700° to 900°C a powdered mixture of the oxides, hydroxides, or carbonates of the metals to be contained in the ceramics to form a solid solution and then sintering at 1200° to 1300°C, then heat treating at a temperature lower by about 100° to 400°C than the sintering temperature, maintaining said heat treating for about 1 to 60 hours, and then cooling the material subjected to said heat treatment at a cooling rate of from about 300°C per hour to about 10°C per hour, so as to increase the tensile strength and decrease the resonant impedance of said ceramics.

4. A method of preparing a ferroelectric ceramic of the formula $Pb(Li_{1/4}Ta_{3/4})O_3$—$PbTiO_3$—$PbZrO_3$ plus $MnO_2$ in solid solution, said method comprising: calcining at 700° to 900°C a powdered mixture of the oxides, hyroxides, or carbonates of the metals to be contained in the ceramics to form a solid solution and then sintering at 1200° to 1300°C, then heat treating at a temperature lower by about 100° to 400°C than the sintering temperature, maintaining said heat treating for about 1 to 60 hours, and then cooling the material subjected to said heat treatment at a cooling rate of from about 300°C per hour to about 10°C per hour, so as to increase the tensile strength and decrease the resonant impedance of said ceramics.

5. A method of preparing a ferroelectric ceramic of the formula $Pb(Zn_{1/3}Ta_{2/3})O_3$—$Pb(Sn_{1/3}Ta_{2/3})O_3$—$PbTiO_3$—$PbZrO_3$ plus $MnO_3$ in solid solution, said method comprising: calcining at 700° to 900°C a powdered mixture of the oxides, hydroxides, or carbonates of the metals to be contained in the ceramics to form a solid solution and then sintering at 1200° to 1300°C, then heat treating at a temperature lower by about 100° to 400°C than the sintering temperature, maintaining said heat treating for about 1 to 60 hours, and then cooling the material subjected to said heat treatment at a cooling rate of from about 300°C per hour to about 10°C per hour, so as to increase the tensile strength and decrease the resonant impedance of said ceramics.

6. A method of preparing a ferroelectric ceramic selected from the group consisting of: $Pb(Ni_{1/3}Ta_{2/3})_{0.37}Ti_{0.36}Zr_{0.27}O_3$, $Pb(Mg_{1/3}Ta_{2/3})_{0.06}(Mn_{1/3}Ta_{2/3})_{0.06}Ti_{0.44}Zr_{0.44}O_3$, $Pb(Li_{1/4}Ta_{3/4})_{0.1}Ti_{0.43}Zr_{0.47}O_3+0.8$ wt% $MnO_2$, and $Pb(Zn_{1/3}Ta_{2/3})_{0.05}(Sn_{1/3}Ta_{2/3})_{0.05}Ti_{0.44}Zr_{0.46}O_3+1$ wt% $MnO_2$, in solid solution, said method comprising: calcining at 700° to 900°C a powdered mixture of the oxides, hydroxides, or carbonates of the metals to be contained in the ceramics to form a solid solution and then sintering at 1200° to 1300°C, then heat treating at a temperature lower by about 100° to 400°C than the sintering temperature, maintaining said heat treating for about 1 to 60 hours, and then cooling the material subjected to said heat treatment at a cooling rate of from about 300°C per hour to about 10°C per hour, so as to increase the tensile strength and decrease the resonant impedance of said ceramics.

* * * * *